(12) United States Patent
Tsuchimoto et al.

(10) Patent No.: US 7,008,504 B2
(45) Date of Patent: Mar. 7, 2006

(54) MANUFACTURING METHOD OF POLARIZING FILM, POLARIZING FILM, OPTICAL FILM, AND VISUAL DISPLAY

(75) Inventors: Kazuki Tsuchimoto, Ibaraki (JP); Youichirou Sugino, Ibaraki (JP); Takashi Shouda, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 224 days.

(21) Appl. No.: 10/056,752

(22) Filed: Jan. 23, 2002

(65) Prior Publication Data

US 2002/0145801 A1 Oct. 10, 2002

(30) Foreign Application Priority Data

Apr. 6, 2001 (JP) ............................. 2001-108436

(51) Int. Cl.
*B32B 31/20* (2006.01)

(52) U.S. Cl. ................................. 156/309.6; 156/324

(58) Field of Classification Search .................. 156/99, 156/308.2, 309.6, 309.9, 322, 324; 349/96, 349/122; 359/491
See application file for complete search history.

(56) References Cited

U.S. PATENT DOCUMENTS

| | | | | |
|---|---|---|---|---|
| 2,237,567 A | * | 4/1941 | Land ........................... 359/491 |
| 3,051,054 A | * | 8/1962 | Crandon ...................... 359/491 |
| 3,208,902 A | * | 9/1965 | Arond et al. ................ 428/336 |
| 3,322,601 A | * | 5/1967 | Wong et al. ................. 156/499 |
| 3,772,128 A | * | 11/1973 | Kahn et al. .................. 156/555 |
| 4,230,768 A | * | 10/1980 | Hamada et al. ............. 428/352 |
| 4,370,374 A | * | 1/1983 | Raabe et al. ................. 428/216 |
| 4,387,133 A | * | 6/1983 | Ichikawa et al. ........... 428/215 |
| 5,880,800 A | | 3/1999 | Mikura et al. |
| 6,301,045 B1 | | 10/2001 | Liu ............................. 359/484 |
| 6,760,156 B1 | | 7/2004 | Tsuchimoto et al. ........ 359/492 |
| 2005/0019505 A1 | | 1/2005 | Hamamoto et al. |

FOREIGN PATENT DOCUMENTS

| | | |
|---|---|---|
| JP | 2-191902 | 7/1990 |
| JP | 04-241798 | 9/1990 |
| JP | 5-107149 | 4/1993 |
| JP | 6-51117 | 2/1994 |
| JP | 2000-199819 | 7/2000 |
| JP | 2002-303725 | 10/2002 |
| JP | 2002-303727 | 10/2002 |

OTHER PUBLICATIONS

Office Action dated Nov. 10, 2004 issued by Taiwan Patent Office.

* cited by examiner

*Primary Examiner*—Jeff H. Aftergut
*Assistant Examiner*—John L. Goff
(74) *Attorney, Agent, or Firm*—Westerman, Hattori Daniels & Adrian LLP

(57) ABSTRACT

A polarizing film may be manufactured without using adhesives by a method in which a protective film (B) is laminated onto at least one face of a polarizer (A), then adhered by thermocompression bonding. Thus problems on manufacturing method of a polarizing film possibly caused by use of adhesives will not be generated.

21 Claims, 3 Drawing Sheets

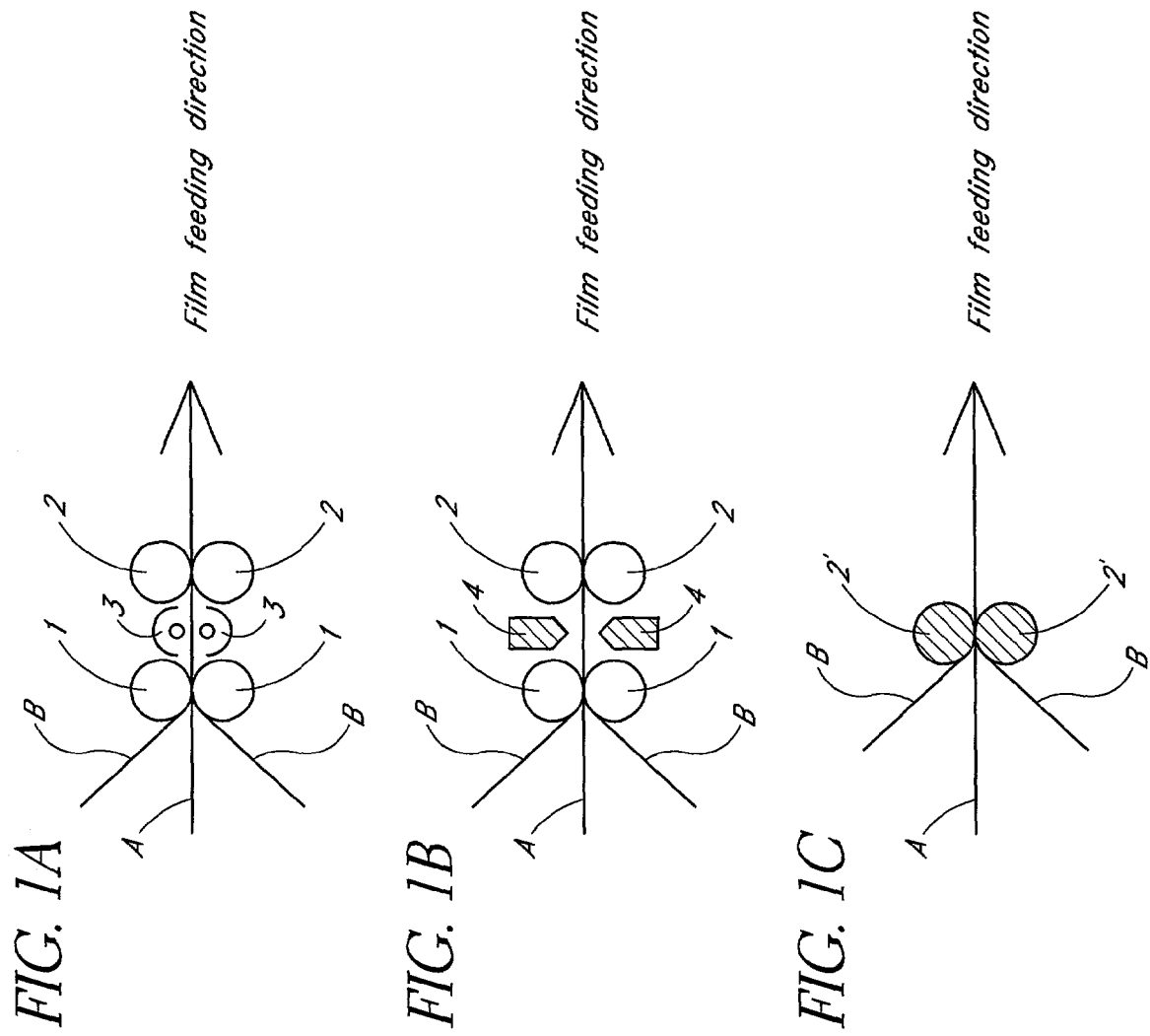

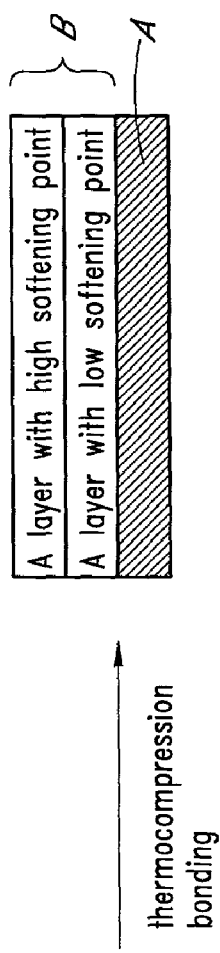
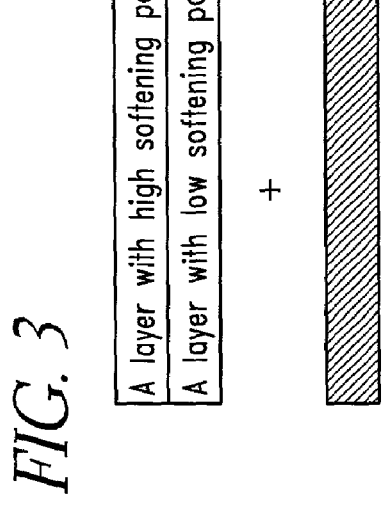
FIG. 3

MANUFACTURING METHOD OF POLARIZING FILM, POLARIZING FILM, OPTICAL FILM, AND VISUAL DISPLAY

BACKGROUND OF THE INVENTION

1. Field of the Invention

The present invention relates to a manufacturing method of a polarizing film. An obtained polarizing film may form a visual display, such as a liquid crystal display, organic EL display, and PDP, as an independent film itself or as an optical film laminated thereof.

2. Description of the Prior Art

In a liquid crystal display, based on a display formation method, it is indispensable to configure a polarizer at both sides of a glass substrate, which forms a top face of a liquid crystal panel. Generally, a polarizing film is used in which a protective film is adhered onto a polarizer comprising a polyvinyl alcohol derived film and dichroism substances, such as iodine.

Conventionally the polarizing film is manufactured by laminating a polarizer onto a protective film by adhesives. Adhesives are compounds or compositions that have a binding component, and these are used also as a solution dissolved in water or in organic solvents and also are cured by heating, light irradiation or chemical reaction, etc. Immediately before a polarizer and a protective film are adhered together these adhesives are poured in between these layers, or they are beforehand applied on either a polarizer or a protective film.

However, when adhesives are used, several manufacturing processes are required, such as a coating process, a laminating process, and a drying process and as a result a large amount of expense is needed for a production equipment. Furthermore a saponification processing, a corona processing, a plasma processing, or a low-voltage UV processing, further an undercoating processing is required to be applied onto a protective film, in order to raise an adhesive property with a polarizer. Consequently, a production cost of the polarizing film obtained also becomes expensive. Moreover, if a manufacturing process is constituted by many processes, a factor generating defects in each of the processes will also be increased.

And moreover, since many types of water-soluble adhesives, such as a polyvinyl alcohol aqueous solution, are used as said adhesives, the polarizing film manufactured fails to have a sufficient durability under heated and humidified conditions. Therefore, an adhesives portion of tends to be affected by moisture and this fault is one of causes of early degradation of a polarizing film.

An object of the present invention, therefore, is providing a manufacturing method of a polarizing film in which problems caused by using adhesives are solved. And an object of the present invention is providing a polarizing film, furthermore an optical film.

SUMMARY OF THE INVENTION

As a result of repeated examinations carried out wholeheartedly by the present inventors to solve said problems, it was found out, as is shown below, that said object may be attained using a manufacturing method of a polarizing film shown below and thus the present invention was completed.

That is, the present invention relates to a manufacturing method of a polarizing film comprising steps of; laminating, i.e., contacting a protective film (B) onto at least one face of a polarizer (A), and thermocompression bonding.

In a manufacturing method of the polarizing film of the present invention, since adhering of a polarizer (A) and a protective film (B) is performed by thermocompression bonding, which comprises a heating treatment and a pressurization, without using adhesives, problems on manufacturing method possibly caused by use of adhesives will not be generated. Moreover, a problem of durability related to adhesives does not occur in the polarizing film obtained.

In said manufacturing method of the polarizing film, it is preferable that the heating treatment is performed from a side of the protective film (B). Laminating can be carried out without giving any damages caused by heating to a polarizer (A) by performing the heat treatment from the protective film (B) side.

In the manufacturing method of the polarizing film, it is preferable that a heating period of time is not more than five seconds. When a heat treatment period of time is controlled in a short time not more than five seconds, a damage possibly given by heating to a polarizer (A) can be suppressed to keep an appearance of the polarizing film obtained not impaired.

In the manufacturing method of the polarizing film, it is preferable that a heating treatment temperature is not less than 90° C. A preferable result is obtained when the heating treatment is performed at a higher temperature, and, although based also on quality of a material of the protective film (B), when the heating treatment is performed not less than 90° C., the adhesion between the polarizer (A) and the protective film (B) is preferably performed. On the other hand, if the heating treatment temperature becomes excessively high, a possibility that a damage may be given to the polarizer (A) is assumed, and therefore the heating treatment temperature of not more than 300° C. is preferable. When the protective film (B) has a high softening temperature, the film must be treated at higher heating treatment temperature and there maybe a possibility of exerting damage by heating on a polarizer (A). In this case, the heating treatment period of time is shortened to obtain a polarizing film without the heating damage to a polarizer (A).

In the manufacturing method of the polarizing film, it is preferable that applying a linear load pressure at not less than 5 N/cm performs the pressurization. Higher pressure used in adhesion may give a better performance, and adhesion between the polarizer (A) and the protective film (B) is well performed when the linear load pressure is not less than 5 N/cm. The linear load pressure is more preferable in a range of 10 to 300 N/cm.

In the manufacturing method of the polarizing film, it is preferable that applying the heating treatment and the pressurization simultaneously performs thermocompression bonding. A better adhesion between the polarizer (A) and the protective film (B) is attained by the pressurization being given simultaneously with the heating treatment.

Moreover, the present invention relates to a polarizing film obtained by the manufacturing method and an optical film in which at least one polarizing film concerned is laminated.

The present invention further relates to a visual display in which the polarizing film or the optical film is used.

BRIEF DESCRIPTION OF THE DRAWINGS

FIG. 1 is a conceptual drawing of a manufacturing method of a polarizing film on which protective films are prepared on both sides;

FIG. 3 is a conceptual drawing in which a protective film and a polarizer are adhered by thermocompression bonding

DETAILED DESCRIPTION OF THE INVENTION

Figure 2A:
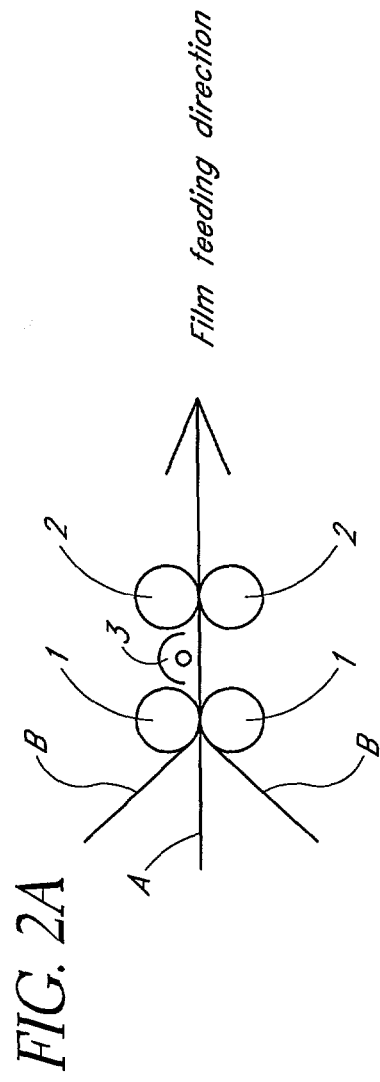
FIG. 2 is a conceptual drawing of a manufacturing method of a polarizing film on which a protective film is prepared in one side.

A polarizing film of the present invention was obtained by laminating a protective film (B) onto at least one face of a polarizer (A) and thermocompression bonding. A polarizer (A) is not limited especially but various kinds of polarizer may be used. As a polarizer (A), for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. The film may also be dipped in aqueous solutions, such as boric acid and potassium iodide, which may contain boric acid, zinc sulfate or zinc chloride, if needed. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a protective film (B) prepared in one side or both sides of the above-mentioned polarizer (A), materials with outstanding transparency, mechanical strength, heat stability, moisture cover property, isotropy, etc. may be preferable. As materials of the above-mentioned protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned.

Since the protective film (B) is adhered by thermocompression bonding onto the polarizer (A) without using adhesives, for example, a film is used in which said materials with a different softening point are suitably selected to form two or more laminated layers. As shown in FIG. 3, a film layer on a side of a layer with a low softening point of the protective film (B) is laminating onto at least one face of the polarizer (A) and thermocompression bonding together, and thus the protective film (B) and the polarizer (A) may be adhered without using adhesives. In FIG. 3, the protective film (B) is adhered by thermocompression bonding only onto one side of the polarizer (A).

Although the material that constitutes each of two or more said film layers may be of the same material or of different material, it is preferable that it may be of the same material. However, as a resin that forms a layer with a low softening point on a side adhered to the polarizer (A), a thermoplastic resin is used that is melted by the thermocompression bonding. A softening point of a resin that forms the layer with a low softening point on a side adhered to the polarizer (A) is preferably not less than 80° C., and more preferably not less than 90° C. Moreover, a difference between the softening points of the resins that form two or more film layers is preferably not less than 5° C. and more preferably not less than 10° C. In addition, a softening point represents a value measured by Vicat softening temperature test method of JIS K7206.

Generally, a thickness of the protective film (B) is not more than 500 μm, and preferably 1 to 300 μm, and especially preferably 5 to 200 μm. Especially a thickness of protective film (B) is preferably not more than 50 μm. In addition, when two or more layers of the protective film (B) are used, the layer with a low softening point on a side adhered onto the polarizer (A) preferably has a thickness of about 1 to 100 μm.

A hard coated layer, antireflection processing, and processing aiming at sticking prevention and diffusion or anti glare may be applied to a face that is not adhered onto the polarizer (A) of said protective film (B). In addition, an antireflection layer, a sticking prevention layer, a diffusion layer, and anti glare layer etc. may be prepared on the protective film (B) itself, and moreover they may also prepared separately as another optical layer on the protective film (B).

The side of a layer with a low softening point of the protective film (B) that has two or more said film layers is laminated on to at least one face of said polarizer (A) and adhered by thermocompression bonding. A heating temperature is preferably set to a temperature in a range between the softening points of each resin that forms the film layer of two or more layers. That is, a temperature at which only the layer with a lower softening point of protective film (B) is melted and the layer with a high softening point layer is not melted.

A method by which the polarizer (A) and the protective film (B) is adhered by thermocompression bonding is not especially limited, and heating treatment and pressurization may performed sequentially or simultaneously. As heating method, for example, a non-contacting heating method in which IR heater, heated air, high frequency, and a supersonic wave, etc. are used, or a contact heating method by heat conduction in which a hot plate, and a heated roll are used may be mentioned. As a method of pressurization, a method with pinch rolls etc. may be mentioned. A pressurization may also be carried out in a vacuum. In a case applying heating treatment and pressurization simultaneously performs adhesion by thermocompression bonding, a method may be adopted in which a laminated film is passed through pinch rolls in a heated state and pressurization is performed simultaneously with heating. The melted film layer (layer with a lower softening point) of the protective film (B) is cooled after an adhesion by thermocompression bonding and is hardened, and consequently a polarizer (A) and protective film (B) are adhered together.

Figure 2B:
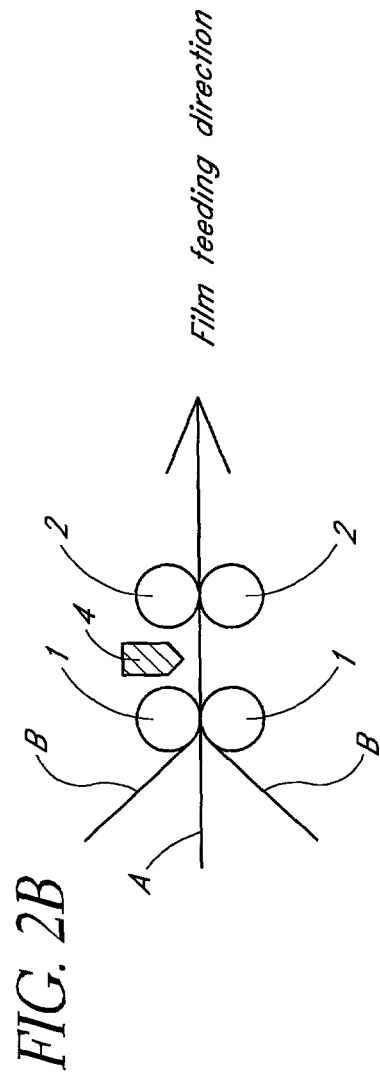
Figure 2C:
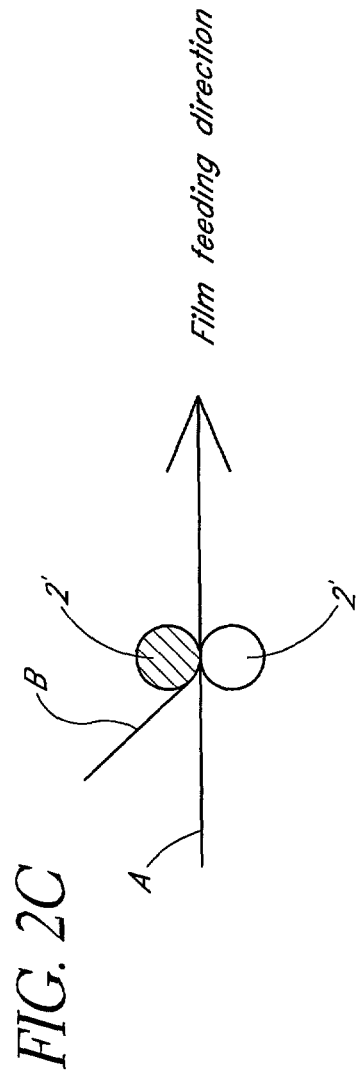

FIG. 1 shows an example in the case where the protective films (B) are adhered by thermocompression bonding onto both sides of the polarizer (A). FIG. 1(a) is a conceptual drawing in which after the protective films (B) are laminated onto both sides of the polarizer (A) by feeding rolls 1, the layers are heated with an IR heater 3, and subsequently adhered by pressure with the pinch rolls 2. FIG. 1(b) is a conceptual drawing in which after the protective films (B) are laminated onto both sides of the polarizer (A) by feeding rolls 1, the layers are heated by hot air feeding equipment 4, and subsequently adhered by pressure with the pinch rolls 2. And, FIG. 1(c) is a conceptual drawing in which thermocompression bonding are simultaneously carried out by heated pinch rolls 2' so that the protective films (B) are adhered onto both sides of the polarizer (A). In any case in FIG. 1, heating treatment is performed from both sides of the protective films (B) laminated on both sides of the polarizer (A). FIG. 2 is an example in the case where the protective film (B) is adhered by thermocompression bonding onto one side of the polarizer (A). In the case of FIG. 2, heating is performed from the protective film (B) side adhered onto one side of the polarizer (A). Moreover, in (a) and (b) of FIG. 1 and FIG. 2, forcible cooling of the rolls 2 in an exit side may be added. In the case of FIG. 2, forcible cooling of the rolls 2 of the polarizer (A) may be carried out.

A polarizing film of the present invention may be used as an optical film laminated with other optical layers when practically used. The optical layers are not especially limited, and one layer or two layers or more of optical layers may be adopted that are used for manufacturing a liquid crystal display etc., such as a reflective plate, a transflective plate, a retardation plate (including half or quarter wavelength plates), and a viewing angle compensation film. Especially, a reflected type polarizing film or a semi-transmission type polarizing film in which a reflective plate or a transflective reflective plate is further laminated onto a polarizing film of the present invention, an elliptically polarizing film or a circular polarizing film in which a retardation plate is further laminated onto a polarizing film, a wide viewing angle polarizing film in which a viewing angle compensation film is further laminated onto a polarizing film, or a polarizing film in which a brightness enhancement film is further laminated onto a polarizing film may preferably be mentioned.

A reflective layer is prepared on a polarizing film to give a reflection type polarizing film, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing film may be formed using suitable methods, such as a method in which a reflective layer of metal etc. is, if required, attached to one side of a polarizing film through a transparent protective layer etc.

As an example of a reflection type polarizing film, a film may be mentioned on which, if required, a reflective layer is formed using a method of attaching a foil and vapor deposition film of reflective metals, such as aluminum, to one side of a matte treated protective film. Moreover, a different type of film with a fine concavo-convex structure on the surface obtained by mixing fine particle into the above-mentioned protective film, on which a reflective layer of concavo-convex structure is prepared, maybe mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing film, a reflection plate may also be used as a reflective sheet constituted by preparing a reflective layer on the suitable film for the transparent film. In addition, since a reflective layer is usually made of metal, it is desirable that the reflective side is covered with a protective film or a polarizing film etc. when used, from a viewpoint of preventing deterioration in reflectance by oxidation, of maintaining an initial reflectance for a long period of time and of avoiding preparation of a protective layer separately etc.

In addition, a transflective type polarizing film may be obtained by preparing the above-mentioned reflective layer as a transflective type reflective layer, such as a half-mirror etc. that reflects and transmits light. A transflective type polarizing film is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing film. That is, the transflective type polarizing film is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarizing film or circularly polarizing film, on which the retardation plate is laminated, will be made in the following paragraph. These polarizing films change linearly polarized light into elliptically polarized light or circularly polarized light, elliptically polarized light or circularly polarized light into linearly polarized light or change the polarizing direction of linearly polarizing by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarizing direction of linearly polarized light.

Elliptically polarizing film is effectively used to give a monochrome display without above-mentioned coloring by compensating (preventing) coloring (blue or yellow color)

produced by birefringence of a liquid crystal layer of a super twisted nematic (STN) type liquid crystal display. Furthermore, a polarizing film in which three-dimensional refractive index is controlled may also preferably compensate (prevent) coloring produced when a screen of a liquid crystal display is viewed from an oblique direction. Circularly polarizing film is effectively used, for example, when adjusting a color tone of a picture of a reflection type liquid crystal display that provides a colored picture, and it also has function of antireflection.

As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose.

And in said elliptically polarizing film or the reflected type elliptically polarizing film, a polarizing film or a reflected type polarizing film and a retardation plate are laminated together in a proper combination. This elliptically polarizing films etc. may be manufactured by a method in which suitable films are laminated separately and sequentially in a manufacturing process of a liquid crystal display so that a combination of a polarizing film (reflected type) and a retardation plate may be constituted, and as mentioned above, a film beforehand constituted as an optical films, such as an elliptically polarizing film, has an outstanding stability in quality and workability in laminating process, etc., and may demonstrate an advantage in manufacturing efficiency of a liquid crystal display etc.

A viewing angle compensation film is a film for extending a viewing angle to give a comparatively clear picture when a screen of a liquid crystal display is viewed from a little slanting direction, not perpendicularly to the screen. As such a viewing angle compensation retardation plate, for example, a plate having a constitution in which orientation layers, such as a retardation film, alignment films made of a liquid crystal polymer, and a alignment layer made of liquid crystal polymer supported on transparent base materials, may be mentioned. In a usual retardation plate, a polymer film having a birefringence is used that is stretched uniaxially in a plane direction, but as a retardation plate used as a viewing angle compensation film a polymer film having a birefringence stretched biaxially in a plane direction, a polymer having a birefringence that is stretched uniaxially in a plane direction and also in a thickness direction and that has further a controlled refractive index in a thickness direction, and a biaxially stretched film like a tilted alignment film may be used. As a tilted alignment film, for example, a film in which a polymer film adhered with a heat shrinking film is heated, and is stretched and/or shrinked in the state where shrinking strength is activated, and a film in which a liquid crystal polymer has tilted alignment may be mentioned. As a raw material polymer for a retardation plate, the same material is used as the polymer described in said retardation plate, and a suitable material is used in order to prevent coloring resulting from variation of a viewing angle based on a retardation by the liquid crystal cell etc., or to expand an viewing angle so that a good view by looking may be obtained.

Moreover, in order to expand an viewing angle so that a good view by looking may be obtained, the alignment layer of a liquid crystal polymer, especially a compensation retardation plate in which an optical anisotropy layer comprising an tilted alignment layer of a discotheque liquid crystal polymer supported by a triacetyl cellulose film may be preferably used.

The polarizing film with which a polarizing film and a brightness enhancement film are adhered together is usually used being prepared in a backside of a liquid crystal cell. A brightness enhancement film shows a characteristic that reflects linearly polarizing light with a predetermined polarizing axis, or circularly polarizing light with a predetermined direction, and that transmits other light, when natural light by back lights of a liquid crystal display or by reflection from a back-side etc., comes in. The polarizing film, which is obtained by laminating a brightness enhancement film to a polarizing film, thus does not transmit light without the predetermined polarizing state and reflects it, while obtaining transmitted light with the predetermined polarizing state by accepting a light from light sources, such as a backlight. This polarizing film makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarizing state. The polarizing film simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarizing direction different from the polarizing axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarizing direction of the light reflected and reversed between the both becomes to have the polarizing direction which may pass a polarizer, the brightness enhancement film transmits the light to supply it to the polarizer. As a result, the light from a backlight may be efficiently used for the display of the picture of a liquid crystal display to obtain a bright screen.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarizing axis, by arranging the polarizing axis of the transmitted light and entering the light into a polarizing film as it is, the absorption loss by the polarizing film is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing film and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing film may consist of multi-layered film of laminated layers of a polarizing film and two of more of optical layers as the above-mentioned separated type polarizing film. Therefore, a polarizing film may be a reflection type elliptically polarizing film or a semi-transmission type elliptically polarizing film, etc. in which the above-mentioned reflection type polarizing film or a transflective type polarizing film is combined with above described retardation plate respectively.

The optical film may be manufactured by laminating the optical layer onto a polarizing film one by one separately in the manufacture process of a liquid crystal display. On the other hand, the optical film in which lamination was beforehand carried out is excellent in a stable quality, a work ability in lamination etc., and has an advantage in improved. A pressure sensitive adhesive layer may be used for laminating. In adhesion of the above-mentioned optical film, those optical axes may be adjusted so that they may give suitable configuration angle according to a desired retardation characteristics.

A pressure sensitive adhesive layer may be used for attachment to liquid crystal cell, to the polarizing film or the optical film laminating at least one polarizing film. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives maybe preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the polarizing film or the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing film top or a optical film top using suitable developing methods, such as flow method and coating method, or a method in which an adhesive layer is once formed on a separator, as mentioned above, and is then transferred on a polarizing film or an optical film may be mentioned.

An adhesive layer may also be prepared on one side or both sides of a polarizing film or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing film or an optical film. Thickness of an adhesive layer may be suitably determined depending on a purpose of usage or adhesive strength, etc., and generally is 1 to 500 $\mu$m, preferably 5 to 200 $\mu$m, and more preferably 10 to 100 $\mu$m.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing film, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

A polarizing film or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing film or optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned polarizing film or optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and back light may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing film, while preparing the polarizing film on the surface side of the transparent electrode.

Since the retardation plate and the polarizing film have function polarizing the light that has entered as incident light from outside and has been reflected by the metal electrode, they have an effect of making the mirror surface of metal electrode not visible from outside by the polarizing action. If a retardation plate is configured with a quarter wave length plate and the angle between the two polarizing directions of the polarizing film and the retardation plate is adjusted to π/4, the mirror surface of the metal electrode may be completely covered.

This means that only linearly polarized light component of the external light that enters as incident light into this organic EL display is transmitted with the work of polarizing film. This linearly polarized light generally gives an elliptically polarized light by the retardation plate, and especially the retardation plate is a quarter wave length plate, and moreover when the angle between the two polarizing directions of the polarizing film and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarizing direction of the polarizing film, it cannot be transmitted through the polarizing film. As the result, mirror surface of the metal electrode may be completely covered.

EXAMPLE

Examples showing constitution and effects of the present invention will be concretely described hereinafter.

(Protective Film)

A protective film having a two-layer structure of a polypropylene film (10 μm) with softening point of 125° C., and of a polypropylene film (50 μm) with softening point of 135° C. was used.

(Preparation of a Polarizing Film)

A polarizer (polyvinyl alcohol derived film) with a thickness of 30 μm was used.

Example 1

As shown in FIG. 1(a), material films were fed so that the film face with softening point of 125° C. of protective films were laminated onto both sides of a polarizer, and was passed through feeding rolls. Subsequently, after being heated to 130° C. with IR heater, the laminated film was passed through pinch rolls to be pressed together and a polarizing film was obtained. A heating period of time (passing period between rolls) was two seconds and a linear load pressure of pinch rolls was 20 N/cm. In the obtained polarizing film, the polarizer and the protective film were adhered and had a satisfactory appearance.

Example 2

As shown in FIG. 1(b), material films were fed so that the film face with softening point of 125° C. of protective films were laminated onto both sides of a polarizer, and was passed through feeding rolls. Subsequently, after being heated to 130° C. using hot air feeding equipment, the laminated film was passed through pinch rolls to be pressed together and a polarizing film was obtained. The heating period of time (passage period during a roll) was four seconds and a linear load pressure of pinch rolls was 40 N/cm. In the obtained polarizing film, the polarizer and the protective film were adhered and had a satisfactory appearance.

Example 3

As shown in FIG. 1(c), after material films were fed so that film faces with softening point of 125° C. of protective films maybe laminated both sides of a polarizer, they were passed through rolls heated at 130° C. and pressed to obtain a polarizing film. The heating period of time (passage period during a roll) was 0.1 seconds and a linear load pressure of pinch rolls was 20 N/cm. In the obtained polarizing film, the polarizer and the protective film were adhered and had a satisfactory appearance.

What is claimed is:

1. A manufacturing method of a polarizing film comprising steps of:
    contacting a protective film (B) comprising at least two layers having different softening points onto at least one face of a polarizer (A) comprising a stretched polymer film made of dyed hydrophilic polymer film, without using an adhesive, and
    thermocompression bonding,
    wherein a heating treatment is performed for a period of time of not more than five seconds.
2. The manufacturing method of the polarizing film according to claim 1, wherein the heating treatment is performed from a side of the protective film (B).
3. The manufacturing method of the polarizing film according to claim 2, wherein a temperature of the heating treatment is not less than 90° C.
4. The manufacturing method of the polarizing film according to claim 1, wherein a pressurization is performed by applying a linear loads pressure at not less than 5 N/cm.
5. The manufacturing method of the polarizing film according to claim 1, wherein thermocompression bonding is performed by applying a heating treatment and a pressurization simultaneously.
6. The manufacturing method of the polarizing film according to claim 4, wherein the pressurization is performed at not less than 20 N/cm.
7. The manufacturing method according to claim 1, wherein a softening point of a layer having a low softening point is not less than 80° C.
8. The manufacturing method according to claim 1, wherein a softening point of a layer having a low softening point is not less than 90° C.
9. The manufacturing method according to claim 1, wherein a difference between softening points of the layers is not less than 5° C.
10. The manufacturing method according to claim 1, wherein a difference between softening points of the layers is not less than 10° C.
11. A manufacturing method of a polarizing film comprising steps of:
    contacting a protective film (B) comprising at least two layers having different softening points onto at least one face of a polarizer (A) comprising a dyed hydrophilic polymer film, without using an adhesive, and
    thermocompression bonding,
    wherein a heating treatment is performed for a period of time of not more than five seconds.
12. The manufacturing method according to claim 1, wherein the polarizer (A) has a thickness of about 5 to about 80 microns.
13. The manufacturing method of the polarizing film according to claim 2, wherein a pressurization is performed by applying a linear loads pressure at not less than 5 N/cm.
14. The manufacturing method of the polarizing film according to claim 3, wherein a pressurization is performed by applying a linear loads pressure at not less than 5 N/cm.
15. The manufacturing method of the polarizing film according to claim 2, wherein thermocompression bonding is performed by applying the heating treatment and a pressurization simultaneously.
16. The manufacturing method of the polarizing film according to claim 3, wherein thermocompression bonding is performed by applying the heating treatment and a pressurization simultaneously.
17. The manufacturing method of the polarizing film according to claim 4, wherein thermocompression bonding is performed by applying a heating treatment and the pressurization simultaneously.
18. The manufacturing method of the polarizing film according to claim 11, wherein the heating treatment is performed from a side of the protective film (B).
19. The manufacturing method of the polarizing film according to claim 18, wherein a temperature of the heating treatment is not less than 90° C.
20. The manufacturing method of the polarizing film according to claim 11, wherein a pressurization is performed by applying a linear loads pressure at not less than 5 N/cm.
21. The manufacturing method of the polarizing film according to claim 11, wherein thermocompression bonding is performed by applying a heating treatment and a pressurization simultaneously.

* * * * *